June 9, 1959  C. G. HARD AF SEGERSTAD  2,889,817
FLUID-OPERATED MOTOR OF THE RECIPROCATING TYPE
Filed Oct. 21, 1953  2 Sheets-Sheet 1
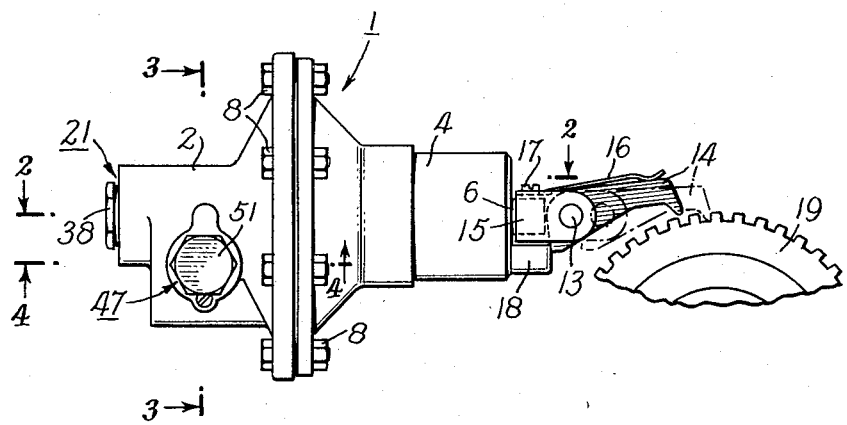
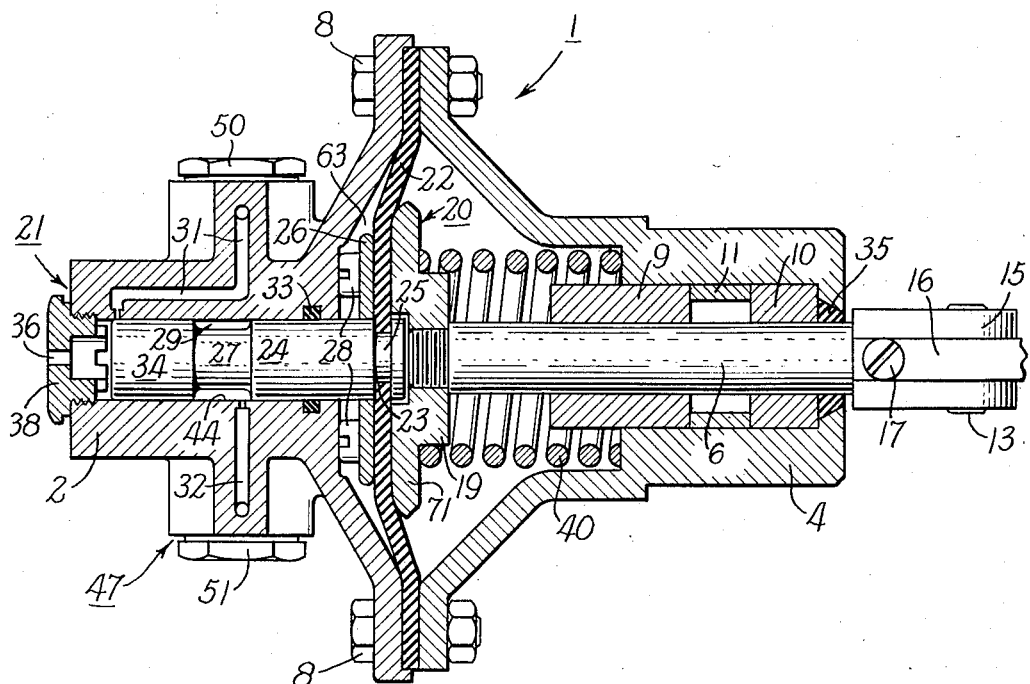
INVENTOR
Carl Gustaf Hård af Segerstad
BY
Curtis, Morris + Safford
ATTORNEYS June 9, 1959 C. G. HARD AF SEGERSTAD 2,889,817
FLUID-OPERATED MOTOR OF THE RECIPROCATING TYPE
Filed Oct. 21, 1953 2 Sheets-Sheet 2
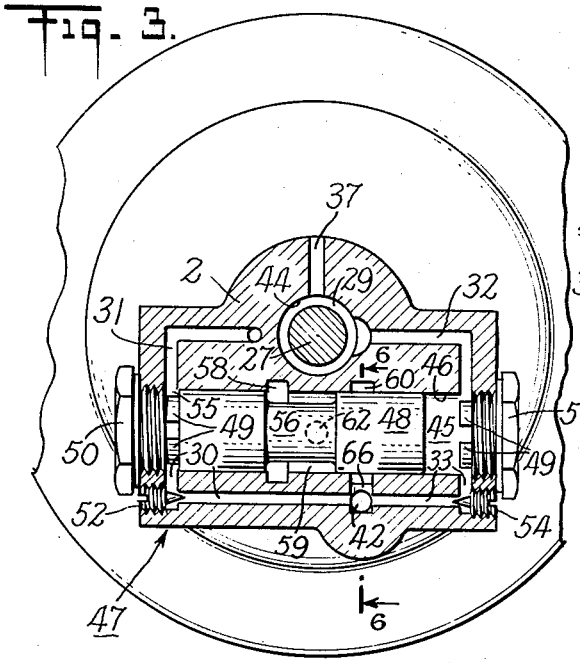
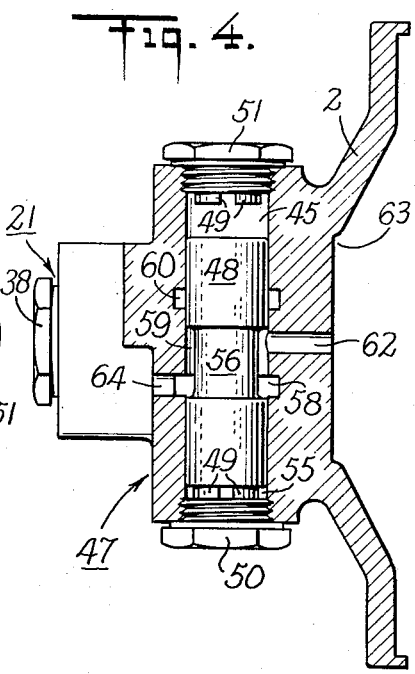
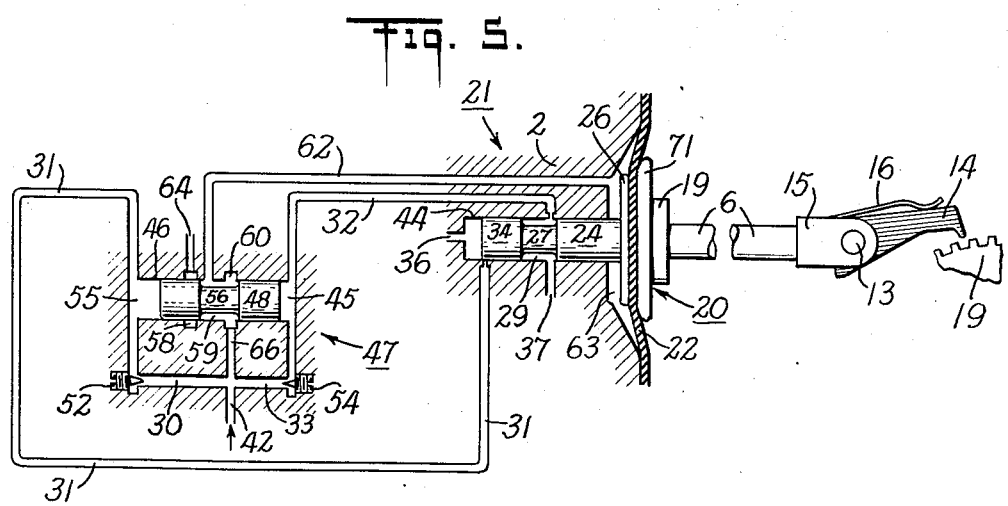
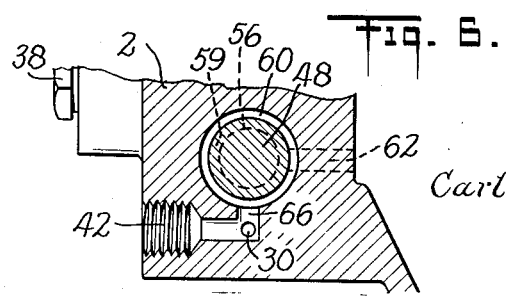
INVENTOR
Carl Gustaf Hård af Segerstad
BY
Curtis, Morris & Safford
ATTORNEYS United States Patent Office 2,889,817
Patented June 9, 1959

2,889,817

FLUID-OPERATED MOTOR OF THE RECIPROCATING TYPE

Carl Gustaf Hard af Segerstad, Sandviken, Sweden

Application October 21, 1953, Serial No. 387,375

6 Claims. (Cl. 121—48)

This invention relates to motors operated by pressure mediums, such as fluids, and especially to air motors of the reciprocating type, which are adapted for use as servo motors.

An object of this invention is to provide a motor of the above type, which is capable of operating at a considerably greater speed than such motors heretofore known. A further object is to provide motors of the above character, in which the objectionable effects of friction are eliminated. A still further object is to provide motors of the above character which may be of standardized construction, and which are adaptable to many conditions of use and operation. A still further object is to provide for the above with a structure which is sturdy and light in weight, and which is inexpensive to manufacture, operate and maintain. These and other objects will be in part obvious, and in part pointed out below; and will be described in the accompanying specifications and illustrated in the drawings, it being understood that the embodiment shown is given by way of example.

In the drawings:

Figure 1 is a side elevation of a motor according to the invention;

Figures 2, 3, and 4 are sectional views on the lines 2—2, 3—3 and 4—4, respectively, of Figure 1;

Figure 5 is a schematic representation of the valves and air flow arrangement in the embodiment of Figures 1 to 4; and, Figure 6 is a fragmentary sectional view on the line 6—6 of Figure 3.

Referring particularly to Figure 2 of the drawings, the illustrative embodiment of the invention has a shell 1 formed by two main frame members 2 and 4 which are clamped together by a number of bolts and nuts 8. The frame member 4 has a cylindrical portion at the right within which a pair of self-lubricating bearings 9 and 10 are held by frictional engagement with the surrounding wall and are spaced apart by a sleeve 11. A sealing washer 35 surrounds and seals a shaft at the opening in the shell. Shaft 6 is adapted to slide to the right from the retracted position shown to an extended position, and during operation it reciprocates between these two positions.

Shaft 6 carries upon its right-hand end a swinging pawl 14 (see also Figure 1) which is pivoted by a pin 13 in a bracket 15. A leaf-spring 16 is clamped at its left-hand end to bracket 15 by a screw 17, and the right-hand end of the spring presses downwardly upon the end of the pawl thus to tend to swing the pawl clock-wise toward engagement with a cogwheel 19. Frame member 4 has a lug 18 which projects outwardly to the right beneath shaft 6 and is engaged by the bottom of the pawl when shaft 6 approaches its left-hand position, as shown. This engagement swings the pawl upwardly against the action of spring 16, so that the pawl is disengaged from cogwheel 19. This permits the cogwheel to rotate freely when the shaft 6 is in the left-hand position. However, when the shaft starts to move to the right from the position shown, the pawl swings downwardly and engages the cogwheel and moves it, thus to transmit a step-turning movement to the cogwheel.

Referring again to Figure 2, the left-hand end of shaft 6 has threaded thereon a plate member 20 which has a hub portion 19 and a flange portion 71. Plate member 20 is adapted to receive the end of a helical compression spring 40, the other end of which rests against an annular seat in frame member 4. Thus the spring exerts force upon plate member 20 tending to urge the plate member and the shaft 60 to the left. Clamped between the peripheral flanges of the frame members 2 and 4 is a diaphragm 22 which is also clamped to plate member 20 by a clamping plate 26 and a number of stud bolts 28.

Positioned at the left of shaft 6 and in axial alignment therewith is a pilot valve 21 having a valve member 24 which is freely slidable in a valve bore 44 in the frame member 2 which is the body portion of the valve member. Valve member 24 has an annular groove 25 near its right-hand end, and diaphragm 22 has a central opening 23. The end of the valve member extends through this opening 23 and the diaphragm extends into groove 25, thus to provide an operating connection between the valve member and the diaphragm. A sealing ring 33 surrounds the right-hand end of valve 24 in a recess in the surrounding wall. The valve member has a control portion 27 of reduced diameter which provides an annular passageway 29 within the valve bore. At the left of this reduced portion is a valve portion 34. The left-hand end of the valve bore is closed by a screw plug 38 which has a central exhaust bore or port 36.

Referring now to Figure 3, frame member 2 has at the top an air vent or exhaust port 37 which extends from the annular passageway 29 to the atmosphere. Also extending from the vicinity of the annular passageway 29 in frame member 2 is a passageway 32 which extends from a port in bore 44 horizontally and thence downwardly to the right-hand end chamber 45 of the bore 46 of a control valve 47 having a sliding valve member 48. Hence, frame member 2 acts as the body portion for valve 47. Valve member 48 is adapted to slide between two extreme positions at the ends of bore 46, and has a central portion 56 of reduced diameter which provides an annular valve passageway 59. The ends of bore 46 are closed by screw plugs 50 and 51 which have integral lugs 49 which act to limit the sliding movement of valve member 48. Hence, even when the valve member is in the right-hand position, the end of passageway 32 is not closed off, and the valve member does not cut off the passageways at the left when in the left-hand extreme position.

At the bottom of end chamber 45 in valve bore 46 and in diametric alignment with this end of passageway 32 there is an air inlet passageway or bore 33 which extends downwardly and to the left to an air inlet port 42. Passageway 33 has a right angle bend therein at which there is a needle valve 54. Valve 54 is adjustable by means of a screw driver, and restricts the flow of air through passageway 33. Extending to the left from the air inlet port 42 is another air inlet passageway 30 which has an adjustable needle valve 52 therein identical with needle valve 54, and the passageway 30 opens into the left-hand end chamber 55 of the valve bore 46. Extending upwardly from the left-hand end chamber 55 of valve bore 46 is an air outlet passageway 31 which extends upwardly and to the right, and thence (see the upper left-hand portion of Figure 2) to the left parallel to the valve bore 44, and it terminates in a port adjacent to the end of valve bore 44. Passageways 31 and 32 have ports of reduced width and of increased arcuate extent (see Figure 3) so as to give a sharp cut-off for each of the ports as the valve moves.

Referring again to Figures 3 and 4, bore 46 has a pair of spaced annular passageways 58 and 60. Passageway 60 (see also Figure 6) is connected to the air inlet port 42 by a passageway 66, and (see Figure 4) passageway 58 is provided with an air exhaust port 64. Intermediate passageways 58 and 60 there is an air delivery passageway 62 which extends from the valve bore to the operating chamber 63 (see Figure 2) in shell 1 and at the left of diaphragm 22.

The working relationships between pilot valve 21 and control valve 47 and the fluid passageways are represented schematically in Figure 5, although it should be understood that the elements are in fact positioned relative to each other as in Figures 1 to 4. In Figure 5, it is assumed that valve member 48 of the control valve has just moved to the position shown. Hence, compressed air from 42 is entering through passageway 66 to the annular passageway 59, and thence through passageway 62 to the operating chamber 63. Air is also flowing through passageway 30 past the restricting valve 52 to the chamber 55 of bore 46; and, air is also flowing through passageway 33 through restricting valve 54 to the opposite end chamber 45 of bore 46. Chamber 45 is connected by passageway 32 to annular passageway 29 because valve member 24 is positioned as shown, and passageway 29 connects passageway 32 to the exhaust port 37. Therefore, the air flowing through restricting valve 54 to chamber 45 is immediately exhausted and no air pressure builds up within chamber 45. However, at this time, valve member 24 is positioned to close the port of passageway 31 so that the air flowing through passageway 30 into chamber 55 builds up pressure, whereas there is little or no pressure in chamber 45. This pressure condition acts to slide valve member 48 toward chamber 45. In Figure 5, the valve member has already moved, and the pressure in chamber 55 holds the valve member in the position shown.

However, as pointed out above, air is flowing to the operating chamber 63, and the pressure is soon sufficient to move the operating assembly of diaphragm 22 to the right. This operating assembly includes valve member 24, and the movement is sufficient to slide the valve portion 34 so that it covers the outlet port of passageway 32. Hence, the exhaust outlet from chamber 45 is cut off so that the air flowing through valve 54 is held in this chamber, and the air pressure builds up. The movement of valve portion 34 of valve member 24 just referred to, uncovers the port outlet of passageway 31 so that this passageway is now connected through the end of the valve bore 44 to the air exhaust port 36. Hence, the pressure condition in chamber 55 is relieved and the air flowing through valve 52, as well as the air in chamber 55, is exhausted. Therefore, the rising pressure in chamber 45, and the reduced pressure in chamber 55 cause valve member 48 to move toward the opposite end of the bore 46. This movement of valve member 48 closes the port of passageway 66, and opens the exhaust port 64 to the annular passageway 59. Passageway 62 is still open to passageway 59 so that passageway 62 is now connected to the exhaust port 64, and the air from chamber 63 is immediately exhausted. The exhausting of the air from chamber 63 permits spring 40 to return the operating assembly to the position shown, and the cycle of operation has then been completed.

The cycle of operation just described involves the sliding movement of shaft 6 and pawl 14 to and from an extended position. This cycle also involves moving valve member 24 to and from a position wherein it causes valve member 48 to be moved to the opposite end of its chamber. This, in turn, introduces air under pressure to the operating chamber, and the return of valve member 48 exhausts this air. The movement of shaft 6 and pawl 14 toward its extended position causes the pawl to engage a tooth of cogwheel 19, and to then turn the cogwheel the distance of the spacing of the teeth. The return movement of the shaft and pawl withdraws the pawl from engagement with the cogwheel.

The cyclic operation is efficient and dependable, and the speed of operation may be varied, particularly by adjusting the restricting valves 52 and 54. Thus, for example, if these valves are adjusted to reduce the rates of air flow, the speed of operation is reduced, and the contrary is true. Furthermore, the force exerted by pawl 14, and to some extent the speed of the operation, is varied by varying the pressure of the air supplied to the unit.

It is to be understood that the specific form of my invention described herein for the purpose of disclosure and to illustrate the principles involved will suggest to those skilled in the art various changes, modifications, and substitutions that do not depart from the scope of the invention. Thus, for example, the length of the stroke may be varied, and the relative sizes of the parts may be changed. Furthermore, two or more of these units may be used together for driving one or several elements. Under some circumstances, it is desirable to use compressed gases other than air as the pressure medium, and liquids may also be used. Certain important aspects of the invention may also be achieved by a unit wherein the pressure medium is supplied alternately to the two sides of the diaphragm.

I claim:

1. A fluid-operated servo motor comprising, a motor frame, including a cylindrical portion which is flared outwardly at one end in the form of a frusto-conical portion, a cover portion clamped to the outer periphery of said frusto-conical portion thereby forming an operating chamber at the end of said cylindrical portion and between said frusto-conical portion and said cover portion, an operating member positioned within said operating chamber and sealed at its periphery against the passage of fluid, an operating shaft fixed to said operating member and projecting axially through said cylindrical portion, means providing support for said operating shaft, a compression spring partially positioned within said frusto-conical portion and having one end resting against said operating member and having its other end seated within said cylindrical portion, a valve shell assembly mounted upon said cover portion and including a first cylindrical valve chamber and a second cylindrical valve chamber, said first valve chamber being in axial alignment with said operating shaft, a first valve member rigidly mounted on said operating member in axial alignment with said operating shaft and projecting into said first valve chamber, a second valve member slidably mounted within said second valve chamber, said second valve member forming with its valve chamber a valve arrangement connecting a supply of fluid into said operating chamber when said second valve member is in one position and connecting said operating chamber to an exhaust port when said second valve member is in another position, means supplying fluid through adjustable metered flow means and separate fluid passageways in said valve shell assembly to the opposite ends of said second valve chamber, said valve shell assembly including a pair of separate fluid passageways extending to spaced ports in said first valve chamber, said first valve member being mounted to move upon the reciprocation of said operating member between two positions in each of which one of said ports is connected to an exhaust port, and the other is closed.

2. Apparatus as described in claim 1, wherein said second valve chamber is positioned with its axis parallel to a line tangent to the outer surface of said first valve chamber, and wherein each of said valve members has a central portion of reduced diameter which permits the flow of fluid as specified upon the movement of the valve member to its respective positions.

3. In a device of the character described, a casing having an operating chamber therein with a single fluid line extending thereto, an operating member comprising a central rigid member to which operating means is attached and a flexible diaphragm fixed to said rigid member and sealed at its periphery to said casing whereby it forms a flexible moving wall of said operating chamber mounted within said casing and adapted to be moved from a rest position to an extended position by the supplying of fluid to said operating chamber, a control valve formed by a valve member slidably mounted in a bore and having a central cut-away portion, said single fluid line extending from said operating chamber to the central portion of said bore and being connected to a fluid source when said valve member is in one extreme position and being connected to a fluid discharge opening when said valve member is in its other extreme position, restricted fluid passageways through which fluid is supplied continuously to the opposite ends of said bore with a restricted rate of flow, a pilot valve which includes a movable pilot valve member which is positioned co-axially with said operating member and is moved by the movement of said operating member, said control valve having its axis and its line of movement parallel to a tangent of the bore of said pilot valve, a pair of exhaust lines extending respectively from the opposite ends of said bore to said pilot valve and alternately connected to an exhaust opening by the alternate movement of said pilot valve member between two positions.

4. Apparatus as described in claim 3, wherein said casing includes a pair of mating shells and said diaphragm is clamped between said shells and wherein said central rigid member clamps said diaphragm, and a coil spring mounted within one of said shells and urging said rigid member toward its rest position.

5. A fluid-operated servo-motor comprising, a motor frame, including a cylindrical portion which has a chamber portion at one end, a cover portion clamped to the outer periphery of said chamber portion thereby forming an operating chamber at the end of said cylindrical portion and between said cylindrical portion and said cover portion, an operating member positioned within said operating chamber and sealed at its periphery against the passage of fluid, an operating shaft fixed to said operating member and projecting axially through said cylindrical portion, means providing support for said operating shaft, a compression spring partially positioned within said chamber portion and having one end resting against said operating member and having its other end seated within said cylindrical portion, a valve shell assembly mounted upon said cover portion and including a first cylindrical valve chamber and a second cylindrical valve chamber, said first valve chamber being in axial alignment with said operating shaft, a first valve member rigidly mounted on said operating member in axial alignment with said operating shaft and projecting into said first valve chamber, a second valve member slidably mounted within said second valve chamber, said second valve member forming with its valve chamber a valve arrangement connecting a supply of fluid into said operating chamber when said second valve member is in one position and connecting said operating chamber to an exhaust port when said second valve member is in another position, means supplying fluid at a limited rate of flow through separate fluid passageways in said valve shell assembly to the opposite ends of said second valve chamber, said valve shell assembly including a pair of separate fluid passageways extending from the opposite ends of said second valve chamber to spaced ports in said first valve chamber, said first valve member being mounted to move upon the reciprocation of said operating member between two positions in each of which one of said ports is connected to an exhaust port and the other is closed.

6. Apparatus as described in claim 5, wherein said second valve member is an elongated cylindrical structure with valve slide portions at its ends and with a reduced central portion past which fluid may flow, said valve shell assembly having formed therein a fluid supply and exhaust passageway extending from substantially the center of said second valve chamber to said operating chamber and two other passageways connecting to said second valve chamber and spaced from each other upon the opposite sides of the connection with said fluid supply and exhaust passageway, one of said last-named passageways constituting the fluid supply passageway and the other constituting the fluid exhaust passageway.

References Cited in the file of this patent

UNITED STATES PATENTS

| | | |
|---|---|---|
| 335,855 | Toole | Feb. 9, 1886 |
| 368,089 | Hinds | Aug. 9, 1887 |
| 609,133 | Wyke | Aug. 16, 1898 |
| 968,453 | Daellenbach | Aug. 23, 1910 |
| 1,067,613 | Lane | July 15, 1913 |
| 1,309,724 | Folberth | July 15, 1919 |
| 1,526,025 | Street | Feb. 10, 1925 |
| 1,939,887 | Ferris | Dec. 19, 1933 |
| 2,157,367 | Warner | May 9, 1939 |
| 2,204,000 | Pierce | June 11, 1940 |
| 2,361,206 | Hoppe | Oct. 24, 1944 |
| 2,601,531 | Kimmell | June 24, 1952 |

FOREIGN PATENTS

| | | |
|---|---|---|
| 14,619 | Great Britain | 1890 |